(12) United States Patent
Fujimoto (10) Patent No.: US 8,988,792 B2
(45) Date of Patent: Mar. 24, 2015

(54) OPTICAL SYSTEM, OPTICAL APPARATUS AND METHOD FOR ARRANGING DIFFRACTIVE OPTICAL ELEMENT

(75) Inventor: Makoto Fujimoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 148 days.

(21) Appl. No.: 13/346,708

(22) Filed: Jan. 9, 2012

(65) Prior Publication Data

US 2012/0182617 A1    Jul. 19, 2012

(30) Foreign Application Priority Data

Jan. 13, 2011 (JP) ................................. 2011-004542

(51) Int. Cl.
- *G02B 9/00* (2006.01)
- *G02B 27/00* (2006.01)
- *G02B 27/42* (2006.01)
- *G02B 13/02* (2006.01)

(52) U.S. Cl.
CPC ............ *G02B 13/02* (2013.01); *G02B 27/0018* (2013.01); *G02B 27/4205* (2013.01)
USPC ....................................................... 359/754

(58) Field of Classification Search
USPC .......................... 359/652–655, 721, 754–795
See application file for complete search history.

(56) References Cited

U.S. PATENT DOCUMENTS

| | | | |
|---|---|---|---|
| 2006/0092529 A1* | 5/2006 | Zeng et al. ..................... | 359/784 |
| 2007/0064316 A1 | 3/2007 | Noda | |
| 2011/0134530 A1 | 6/2011 | Koga | |

FOREIGN PATENT DOCUMENTS

| | | |
|---|---|---|
| JP | 10-148757 A | 6/1998 |
| JP | 10-186227 A | 7/1998 |
| JP | 2002-072081 A | 3/2002 |
| JP | 2002-072082 A | 3/2002 |
| JP | 2004-012504 A | 1/2004 |
| JP | 2004-126059 A | 4/2004 |
| JP | 2004-126397 A | 4/2004 |
| JP | 2007-086485 A | 4/2007 |
| WO | WO 2011/004443 A1 | 1/2011 |
| WO | WO 2011/024258 A1 | 3/2011 |

OTHER PUBLICATIONS

U.S. Appl. No. 61/213,729, filed Jul. 8, 2009.

\* cited by examiner

*Primary Examiner* — Mahidere Sahle
(74) *Attorney, Agent, or Firm* — Miles & Stockbridge P.C.

(57) ABSTRACT

A telephoto lens TL having, in order from an object, a plurality of lenses L1, L2, . . . and a diffractive optical element DOE which has a diffraction grating having a rotationally symmetric shape with respect to the optical axis, wherein the diffractive optical element DOE is disposed on any one of lens surfaces of the plurality of lenses L1, L2, . . . , and conditional expression 0.50<fa/Rd<0.90 or 1.10<fa/Rd<2.00 is satisfied, where fa denotes a combined focal length of each lens from the lens L1, which is closest to the object, of the plurality of lenses L1, L2, . . . to the lens L2, on which the diffractive optical element DOE is disposed, and Rd is a radius of curvature of the lens surface on which the diffractive optical element DOE is disposed.

16 Claims, 10 Drawing Sheets

OPTICAL SYSTEM, OPTICAL APPARATUS AND METHOD FOR ARRANGING DIFFRACTIVE OPTICAL ELEMENT

RELATED APPLICATION

This invention claims the benefit of Japanese Patent Application No. 2011-004542 which is hereby incorporated by reference.

TECHNICAL FIELD

The present invention relates to an optical system and an optical apparatus having a diffractive optical element, and a method for arranging a diffractive optical element.

TECHNICAL BACKGROUND

Various optical systems having a diffractive optical element are known and, for example, an optical system where a diffractive optical element is arranged on the cemented surface of two lenses has been proposed (see Japanese Laid-Open Patent Publication No. 2002-72081(A), for example).

SUMMARY OF THE INVENTION

In a conventional optical system having a diffractive optical element however, the generation of a ghost is not considered, hence problems may be generated due to a ghost.

With the foregoing in view, it is an object of the present invention to provide an optical system, an optical apparatus and a method for arranging a diffractive optical element in which the generation of a ghost is controlled.

To achieve this object, an optical system according to the present invention is an optical system having a plurality of lenses arranged in order from an object; and a diffractive optical element which has a diffraction grating, wherein the diffractive optical element is disposed on any one of lens surfaces of the plurality of lenses, and one of the following conditional expressions are satisfied:

$$0.50 < fa/Rd < 0.90 \text{ and}$$

$$1.10 < fa/Rd < 2.00,$$

where fa denotes a combined focal length of each lens from the lens, which is closest to the object, of the plurality of lenses to the lens, on which the diffractive optical element is disposed, and Rd denotes a radius of curvature of the lens surface, on which the diffractive optical element is disposed.

It is preferable that the plurality of lenses of this optical system includes, in order from the object, a first lens group having positive refractive power, and a second lens group having negative refractive power.

In this optical system, it is preferable that the diffractive optical element is disposed on any one of the lens surfaces of the first lens group.

In this optical system, it is preferable that any one of the lens surfaces of the first lens group is a lens surface on the Image side.

In this optical system, it is preferable that the following conditional expression is satisfied:

$$0.50 < f1/fa < 0.80,$$

where f1 denotes a focal length of the first lens group.

In this optical system, it is preferable that the diffractive optical element is disposed on any one of the lens surfaces of the first lens group, and the following conditional expression is satisfied:

$$0.030 < f/fd < 0.060,$$

where f denotes a focal length of the optical system, and fd denotes a focal length of the diffractive optical element.

In this optical system, it is preferable that the following conditional expression is satisfied:

$$0.50 < L/f < 0.75,$$

where L denotes a total length of the optical system, and f denotes a focal length of the optical system.

It is preferable that the diffraction grating of the diffractive optical element has a rotationally symmetric shape.

An optical apparatus according to the present invention is an optical apparatus comprising an optical system for forming an Image of an object on a predetermined surface, and the optical system according to the present invention is used as the optical system.

A method for arranging a diffractive optical element according to the present invention is a method for arranging a diffractive optical element in an optical system having a plurality of lenses arranged in order from an object and a diffractive optical element which has a diffraction grating, this method including a step of disposing the diffractive optical element on any one of lens surfaces of the plurality of lenses, wherein one of the following conditional expressions are satisfied:

$$0.50 < fa/Rd < 0.90 \text{ and}$$

$$1.10 < fa/Rd < 2.00,$$

where fa denotes a combined focal length of each lens from the lens, which is closest to the object, of the plurality of lenses to the lens, on which the diffractive optical element is disposed, and Rd denotes a radius of curvature of the lens surface, on which the diffractive optical element is disposed.

In the method for arranging the diffractive optical element, it is preferable that the plurality of lenses of the optical system includes, in order from the object, a first lens group having positive refractive power, and a second lens group having negative refractive power.

In the method for arranging the diffractive optical element, it is preferable that the diffractive optical element is disposed on any one of the lens surfaces of the first lens group.

In the method for arranging the diffractive optical element, it is preferable that the following conditional expression is satisfied:

$$0.50 < f1/fa < 0.80,$$

where f1 denotes a focal length of the first lens group.

In the method for arranging the diffractive optical element, it is preferable that the diffractive optical element is disposed on any one of the lens surfaces of the first lens group, and the following conditional expression is satisfied:

$$0.030 < f/fd < 0.060,$$

where f denotes a focal length of the optical system, and fd denotes a focal length of the diffractive optical element.

In the method for arranging the diffractive optical element, it is preferable that the following conditional expression is satisfied:

$$0.50 < L/f < 0.75,$$

where L denotes a total length of the optical system, and f denotes a focal length of the optical system.

According to the present invention, the generation of a ghost can be controlled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE EMBODIMENTS

Figure 9:
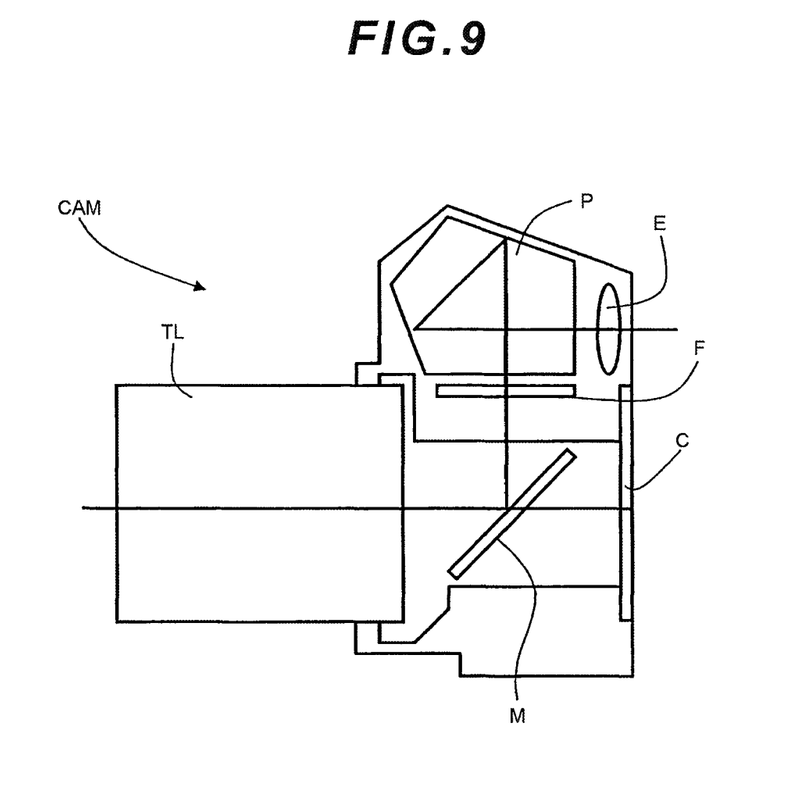
FIG. 9 is a cross-sectional view depicting a digital single lens reflex camera.

Embodiments of the present invention will now be described with reference to the drawings. FIG. 9 shows a digital single lens reflex camera CAM having a telephoto lens TL, which is an example of an optical system according to the present invention. In the digital single lens reflex camera CAM shown in FIG. 9, lights from an object, which is not illustrated, are collected by the telephoto lens (image capturing lens) TL, and form an image on a focal plane plate F via a quick return mirror M. The lights which formed an image on the focal plane plate F are reflected in a penta prism P for a plurality of times and guided to an eye piece E. Thereby the user can observe the image of the object as an erected image via the eye piece E.

If the user presses a release button, which is not illustrated, a quick return mirror M is retracted outside the optical path, and the lights from the object, collected by the telephoto lens TL, form an image of the object on a picture element C. Thereby the image of the lights from the object is formed on the picture element C, is captured by the picture element C, and is recorded in a memory, which is not illustrated, as an image of the object. Thus the user can photograph the object using the digital single lens reflex camera CAM. The same effect as this camera CAM can be obtained, even if a camera, which has no quick return mirror M, is used. The digital single lens reflex camera CAM shown in FIG. 9 may have a removable telephoto lens TL, or may be integrated with a telephoto lens TL.

Figure 1:
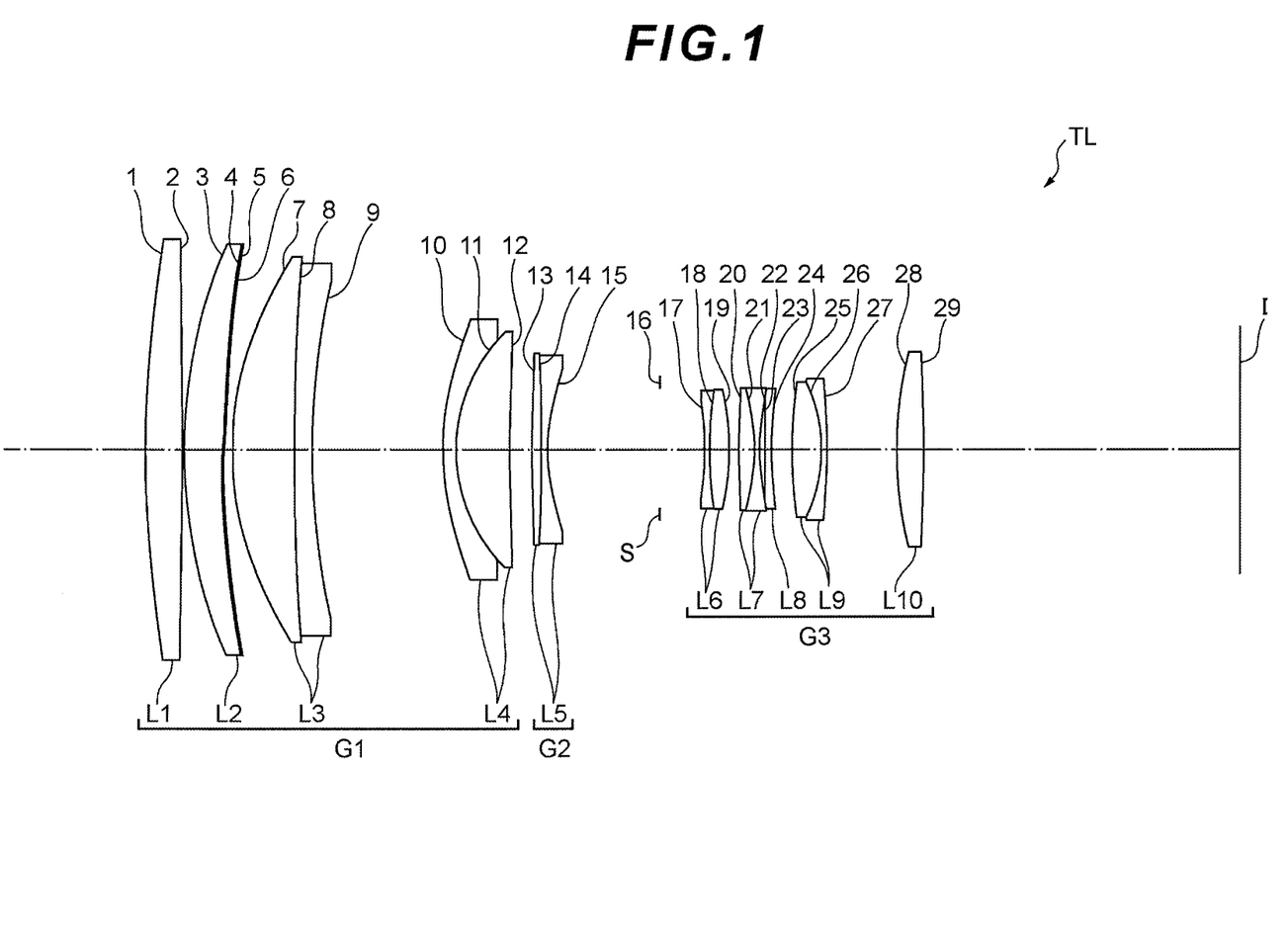
FIG. 1 is a cross-sectional view depicting a telephoto lens according to Example 1.

For example, as FIG. 1 shows, the telephoto lens TL comprises, in order from an object: a plurality of lenses L1, L2, . . . ; and a diffractive optical element DOE which has a diffraction grating (not illustrated) having a rotationally symmetric shape with respect to the optical axis, and the diffractive optical element DOE is disposed on any one of the lens surfaces (e.g. fourth surface) of the plurality of lenses L1, L2, . . . . In the telephoto lens TL having this configuration, it is preferable that one of the following conditional expressions (1) and (2) is satisfied, where fa denotes a combined focal length of each lens from the lens closest to the object in the plurality of lenses L1, L2, . . . to the lens on which the diffractive optical element DOE is disposed, and Rd denotes a radius of curvature of the lens surface on which the diffractive optical element DOE is disposed.

$$0.50 < fa/Rd < 0.90 \quad (1)$$

$$1.10 < fa/Rd < 2.00 \quad (2)$$

Figure 3:
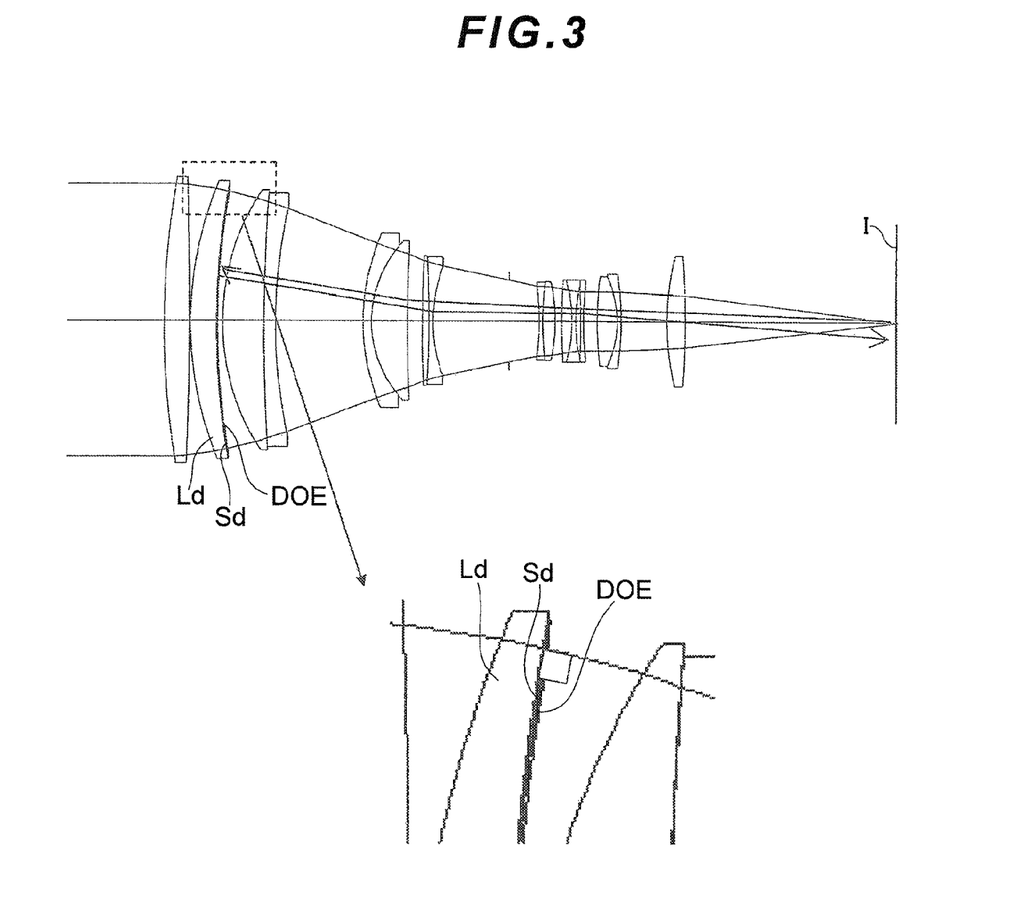
FIG. 3 is a diagram depicting an optical path of a ghost light in an optical system where a ghost is generated.

For the diffractive optical element DOE of the present embodiment, a contact multilayer type diffractive optical element, where two types of diffractive element constituents, each made from different material, contact via a same diffraction grating, for example, is used. The materials of the two types of diffractive element constituents, according to the present embodiment, are a first ultraviolet curing resin, and a second ultraviolet curing resin which is different from the first ultraviolet curing resin. Generally in molding using ultraviolet curing resin, a resin pool for releasing excessive resin must be disposed in a peripheral area, therefore the outer diameter of the lens must be increased somewhat. In order to minimize an increase in the outer diameter of the product, it is preferable that as shown in FIG. 3 the diffractive optical element DOE is disposed on an image plane side lens surface Sd of the target lens Ld.

Generally it is preferable that the incident light to the diffractive optical element enters the element approximately vertically, and is emitted approximately vertically. However as shown in FIG. 3 if the telephoto lens TL is constructed so that the incident light, into the lens surface Sd on which the diffractive optical element DOE is disposed, enters approximately vertically into the lens surface Sd and is emitted approximately vertically, the reflected light from an area near the image plane I is reflected on this lens surface Sd and reaches the image plane I again, that is, a ghost is generated. The reflection surface near the image plane I is a film surface in the case of a silver-halide camera, and is a sensor surface or a low pass filter surface in the case of a digital single lens reflex camera. Particularly in the case of a digital single lens reflex camera, an obvious ghost is generated.

The conditional expression (1) and the conditional expression (2) are conditional expressions for preventing [the generation of] a ghost. If the lower limit value of the conditional expression (1) is not reached, the angle of the incident light to the diffractive optical element DOE increases too much, and the diffraction efficiency decreases. If the upper limit value of the conditional expression (1) is exceeded and the value of the expression becomes close to 1, a ghost light problem occurs.

If the upper limit value of the conditional expression (1) is 0.88, the effect of the present invention can be exhibited well. And if the upper limit value of the conditional expression (1) is 0.85, then the effect of the present invention can be expressed to the fullest.

If the lower limit value of the conditional expression (2) is not reached and the value of the expression becomes close to 1, a ghost light problem occurs. And if the upper limit value of the expression (2) is exceeded, the angle of the incident light to the diffractive optical element DOE increases too much, the diffraction efficiency decreases.

If the lower limit value of the conditional expression (2) is 1.15, the effect of the present invention can be exhibited well. And if the lower limit value of the conditional expression (2) is 1.20, then the effect of the present invention can be expressed to the fullest.

Figure 4:
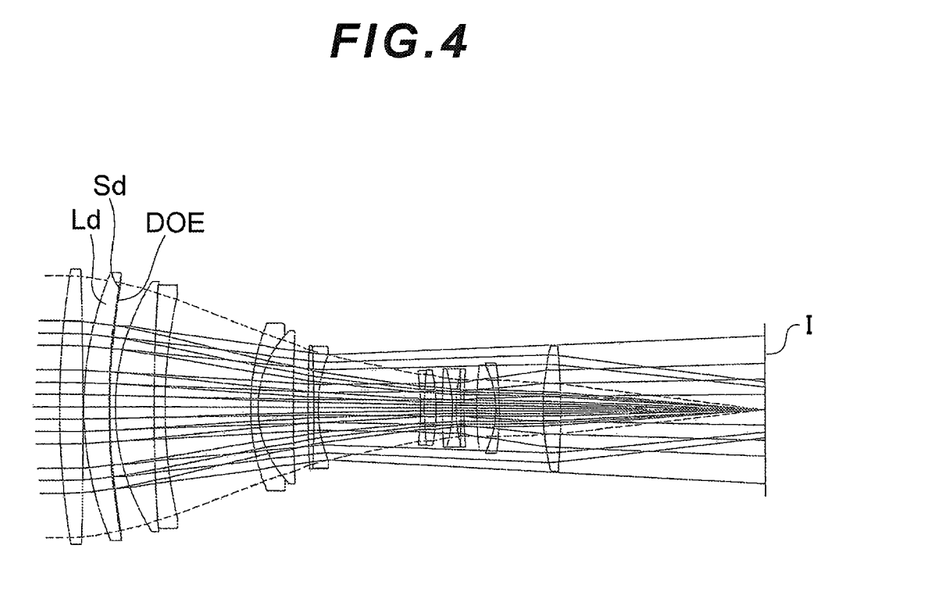
FIG. 4 is a diagram depicting an optical path of a ghost light in an optical system which satisfies the conditional expression (1) or the conditional expression (2)

FIG. 4 shows a ghost light between the image plane I and the lens surface Sd (where the diffractive optical element DOE is disposed) in the case when the conditional expression (1) or the conditional expression (2) is satisfied. As FIG. 4 shows, the light which is reflected on the image plane I is then reflected on the lens surface Sd where the diffractive optical element DOE is disposed, and reaches the image plane I again, disperses, and does not cause a ghost light problem. By satisfying the conditional expression (1) or the conditional expression (2) like this, an optical system (telephoto lens TL) in which the generation of a ghost is controlled, and an optical apparatus (digital single lens reflex camera CAM) having this optical system, can be Implemented.

As FIG. 1 shows, it is preferable that this telephoto lens TL has, in order from an object: a first lens group G1 having positive refractive power; and a second lens group G2 having negative refractive power, using a plurality of lenses L1, L2, . . . . Then a telephoto lens TL with a short total length can be obtained, and a ghost generated in the telephoto lens TL with a short total length can be effectively controlled.

In this telephoto lens TL, it is preferable that the diffractive optical element DOE is disposed on one lens surface (e.g. the fourth surface) in the first lens group G1. Then a wide light enters the first lens group G1, therefore the effect of the diffractive optical element DOE can be enhanced by disposing the diffractive optical element DOE in the first lens group G1.

In this telephoto lens TL, it is preferable that the one lens surface in the first lens group G1 is a lens surface on the image side (e.g. the fourth surface). Then a wide light enters the first lens group G1, therefore the effect of the diffractive optical element DOE can be enhanced by disposing the diffractive optical element DOE in the first lens group G1.

In this telephoto lens TL, it is preferable that the following conditional expression (3) is satisfied, where f1 denotes a focal length of the first lens group G1.

$$0.50 < f1/fa < 0.80 \quad (3)$$

The conditional expression (3) specifies an optimum arrangement of the diffractive optical element DOE. If the lower limit values of the conditional expression (3) is not reached, the diffractive optical element DOE is too close to the object, and a flare, due to diffusion on the grating surface of the diffractive optical element DOE, stands out. If the upper limit value of the conditional expression (3) is exceeded, on the other hand, the diffractive optical element DOE is too close to the image plane, and correction of longitudinal chromatic aberration becomes difficult, and a short total length, which is an advantage of the diffractive optical element DOE, cannot be implemented.

If the lower limit value of the conditional expression (3) is set to 0.52, or if the upper limit value of the conditional expression (3) is 0.78, then the effect of the present invention can be exhibited well. And if the lower limit value of the conditional expression (3) is set to 0.55, or if the upper limit value of the conditional expression (3) is 0.75, then the effect of the present invention can be exhibited to the fullest.

In this telephoto lens TL, it is preferable that the diffractive optical element DOE is disposed on one lens surface in the first lens group G1, and the following conditional expression (4) is satisfied, where f denotes a focal length of the telephoto lens TL, and fd denotes a focal length of the diffractive optical element DOE.

$$0.030 < f/fd < 0.060 \quad (4)$$

The conditional expression (4) satisfies the optimum refractive power of the diffractive optical element DOE. If the lower limit value of the conditional expression (4) is not reached, the effect of the diffractive optical element DOE cannot be fully exhibited, and a short total length, which is an advantage of the diffractive optical element DOE, cannot be implemented. If the upper limit value of the conditional expression (4) is exceeded, the refractive power of the diffractive optical element DOE becomes too strong, and the pitch of the diffraction grating becomes too short, which drops the diffraction efficiency.

If the lower limit value of the conditional expression (4) is 0.032, or if the upper limit value of the conditional expression (4) is 0.057, the effect of the present invention can be exhibited well. And if the lower limit value of the conditional expression (4) is 0.033, or if the upper limit value of the conditional expression (4) is 0.055, then the effect of the present invention can be expressed to the fullest.

In this telephoto lens TL, it is preferable that the following conditional expression (5) is satisfied, where L denotes a total length of the telephoto lens TL, and f denotes a focal length of the telephoto lens TL.

$$0.50 < L/f < 0.75 \quad (5)$$

The conditional expression (5) is a conditional expression related to a telephoto ratio. If the lower limit value of the conditional expression (5) is not reached, that is, if the total optical length becomes short, then various aberrations, including spherical aberration, generated in the first lens group G1 increase, and cannot be corrected sufficiently. If the upper limit value of the conditional expression (5) is exceeded, that is, if the total optical length becomes long, on the other hand, the refractive power of the first lens group G1 is weakened, and the refractive power of the diffractive optical element DOE to be required is also weakened, and the longitudinal chromatic aberration in a desired wavelength region cannot be corrected sufficiently.

If the lower limit value of the conditional expression (5) is 0.55, or if the upper limit value of the conditional expression (5) is 0.73, the effect of the present invention can be exhibited well. If the lower limit value of the conditional expression (5) is 0.60, or if the upper limit value of the conditional expression (5) is 0.70, then the effect of the present invention can be expressed to the fullest.

Figure 10:
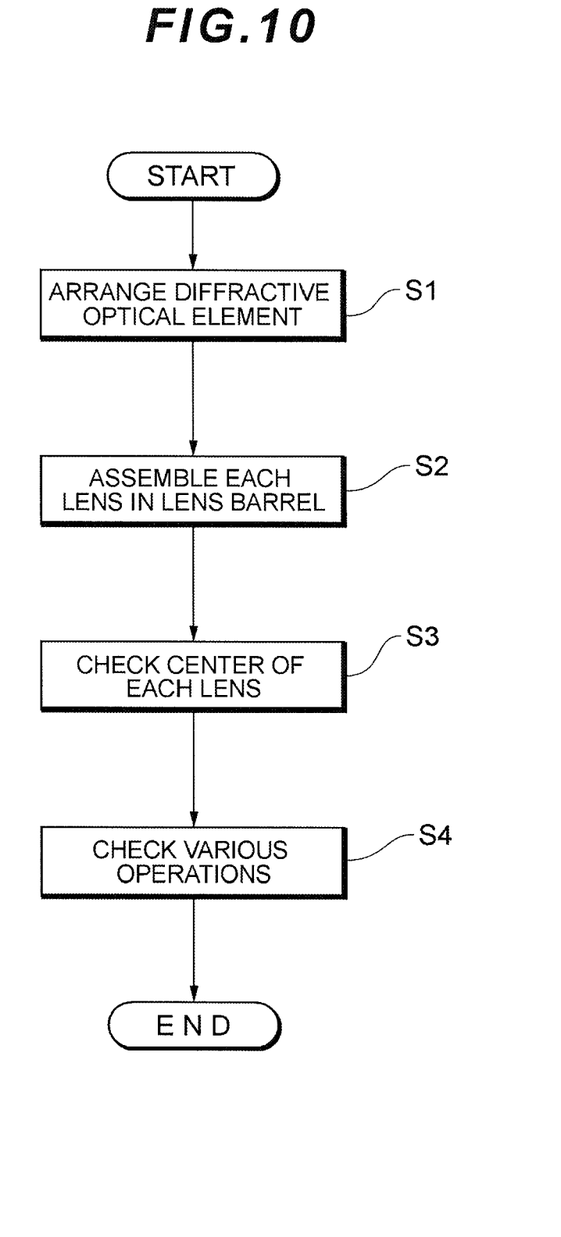
FIG. 10 is a flow chart depicting a method for arranging a diffractive optical element.

A method for arranging the diffractive optical element DOE in the telephoto lens TL having the above mentioned configuration will now be described with reference to FIG. 10. First the diffractive optical element DOE is disposed on a predetermined lens surface (e.g. fourth surface) of each lens L1, L2, . . . of the telephoto lens TL (step S1). Then each lens L1, L2, . . . is assembled in a cylindrical lens barrel, along with the diffractive optical element DOE (step S2). When each lens is assembled in the lens barrel, each lens may be assembled in the lens barrel one at a time, in order along the optical axis, or a part or all of the lenses may be integrated on a holding member and then assembled in the lens barrel. After assembling each lens in the lens barrel, it is checked whether the object image is formed in a state where each lens is assembled in the lens barrel, that is, whether the center of each lens is aligned (step S3). After checking that the image is formed, various operations of the telephoto lens TL are checked (step S4).

Examples of the various operations are: focusing operation in which lens groups, which perform focusing from an object at a long distance to an object at a short distance, move along the optical axis; and a hand motion blur correction operation in which at least a part of the lenses move, so as to have components orthogonal to the optical axis. The sequence of checking the various operations is arbitrary. According to this method, an optical system (telephoto lens TL), in which the generation of a ghost is controlled, can be implemented.

According to the present embodiment, by appropriately using the diffractive optical element DOE in the optical system as mentioned above, a telephoto optical system (telephoto lens TL), which has high optical performance with a low telephoto ratio (total lens length is short) while correcting various aberrations well, including chromatic aberration, and an optical apparatus (digital single lens reflex camera) using this optical system, are implemented.

EXAMPLES

Example 1

Examples of the present application will be explained with reference to attached drawings. Example 1 will now be described with reference to FIG. 1, FIG. 2 and Table 1. FIG. 1 is a cross-sectional view of a telephoto lens TL according to Example 1. The telephoto lens TL according to Example 1 comprises, in order from an object: a first lens group G1 having positive refractive power; a second lens group G2 having negative refractive power; and a third lens group G3 having negative refractive power.

The first lens group G1 includes, in order from an object: a first lens L1 which is a biconvex positive lens; a second lens L2 which is a positive meniscus lens having a convex surface facing the object; a third lens L3 which is a cemented lens; and a fourth lens L4 which is a cemented lens, and a diffractive optical element DOE is disposed on the lens surface on the image plane I side, in the second lens L2. The diffractive optical element DOE is a contact multilayer type diffractive optical element in which two types of diffractive element constituents, each made from different material, contact via a same diffraction grating, and a primary diffraction grating (diffraction grating having a rotationally symmetric shape with respect to the optical axis) is formed by two types of ultraviolet curing resins.

The second lens group G2 includes a fifth lens L5 which is a cemented lens. The third lens group G3 includes, in order from an object: a sixth lens L6 which is a cemented lens; a seventh lens L7 which is a cemented lens; an eighth lens L8 which is a single lens; a ninth lens L9 which is a cemented lens; and a tenth lens L10 which is a single lens. An aperture stop S is disposed between the second lens group G2 and the third lens group G3.

Table 1 to Table 3 shown below list each data value on telephoto lenses according to Example 1 to Example 3. In [General Data] in each table, f is a focal length, FNO is an F number, ω is a half angle of view (maximum incident angle: unit is "°"), Y is an image height, Bf is a back focus (length converted into air), and L is a total lens length (length converted into air). In [Lens Data], the surface number is the number of the lens surface, counted from the object side, ri is a radius of curvature of the i-th lens surface counted from the object side, di is a lens thickness or an air space from the i-th lens surface to the i+1th lens surface counted from the object, nd is a refractive index at d-line (wavelength λ=587.6 nm), and vd is an Abbe number at d-line (wavelength λ=587.6 nm).

The phase form ψ of the diffraction surface shown in [Diffraction Surface Data] is given by the following expression (6), where h denotes height in the vertical direction with respect to the optical axis, m denotes a degree of diffraction of the diffracted light, λ0 denotes a design wavelength, and Ci denotes a phase coefficient (where i=1, 2, 3, . . . ).

$$\psi(h,m)=\{2\pi/(m\times\lambda 0)\}\times(C2\times h^2+C4\times h^4+C6\times h^6\ldots) \quad (6)$$

The refractive power φD of the diffraction surface at an arbitrary wavelength λ and an arbitrary degree of diffraction m is given by the following expression (7), where C1 denotes a phase coefficient at the lowest degree.

$$\phi D(h,m)=-2\times C1\times m\times\lambda/\lambda 0 \quad (7)$$

In [Diffraction Surface Data], phase coefficient is shown, where "E−n" means "×10$^{-n}$". In all data values, "mm" is normally used for the unit of focal length F, radius of curvature ri, surface distance di and other lengths, but the unit is not limited to "mm", since an equivalent optical performance is obtained even if an optical system is proportionally expanded or proportionally reduced. For the data values of the later mentioned Example 2 and Example 3 as well, symbols the same as this example are used.

Table 1 shows each data value of Example 1. The surface numbers 1 to 29 in Table 1 corresponds to the surfaces 1 to 29 in FIG. 1. In Example 1, the fifth surface is the diffraction surface.

TABLE 1

[General Data]

f = 291.00
FNO = 4.1
2ω = 8.5
Y = 21.64
Bf = 54.79
L = 189.71

[Lens Data]

| Surface number | ri | di | nd | vd | |
|---|---|---|---|---|---|
| 1 | 222.223 | 6.51 | 1.6968 | 55.5 | |
| 2 | −1018.757 | 0.25 | | | |
| 3 | 94.019 | 6.70 | 1.5168 | 64.1 | |
| 4 | 201.901 | 0.20 | 1.5278 | 33.4 | |
| 5 | 201.901 | 0.20 | 1.5571 | 50.0 | (Diffraction surface) |
| 6 | 201.901 | 1.23 | | | |
| 7 | 62.102 | 10.50 | 1.4875 | 70.4 | |
| 8 | 452.388 | 3.00 | 1.7495 | 35.3 | |
| 9 | 138.578 | 22.74 | | | |
| 10 | 60.577 | 2.00 | 1.8038 | 33.9 | |
| 11 | 29.653 | 9.40 | 1.4875 | 70.4 | |
| 12 | 352.726 | 3.99 | | | |
| 13 | 381.762 | 1.68 | 1.8467 | 23.8 | |
| 14 | −324.449 | 1.15 | 1.6584 | 50.9 | |
| 15 | 40.263 | 19.61 | | | |
| 16 | ∞ | 7.80 | | | (Aperture stop) |
| 17 | −73.930 | 1.00 | 1.8467 | 23.8 | |
| 18 | 77.336 | 3.31 | 1.6727 | 32.1 | |
| 19 | −46.458 | 1.65 | | | |
| 20 | 174.607 | 2.72 | 1.8467 | 23.8 | |
| 21 | −37.433 | 1.00 | 1.8830 | 40.8 | |
| 22 | 41.156 | 1.27 | | | |
| 23 | −335.567 | 0.80 | 1.8830 | 40.8 | |
| 24 | 97.108 | 3.50 | | | |
| 25 | 88.419 | 5.11 | 1.6200 | 36.3 | |
| 26 | −27.129 | 1.00 | 1.8830 | 40.8 | |
| 27 | −88.112 | 11.85 | | | |
| 28 | 70.183 | 4.76 | 1.5796 | 53.7 | |
| 29 | −214.607 | 54.79 | | | |

TABLE 1-continued

[Diffraction Surface Data]

m = 1
C1 = −6.049E−05
C2 = 9.191E−10

Figure 2:
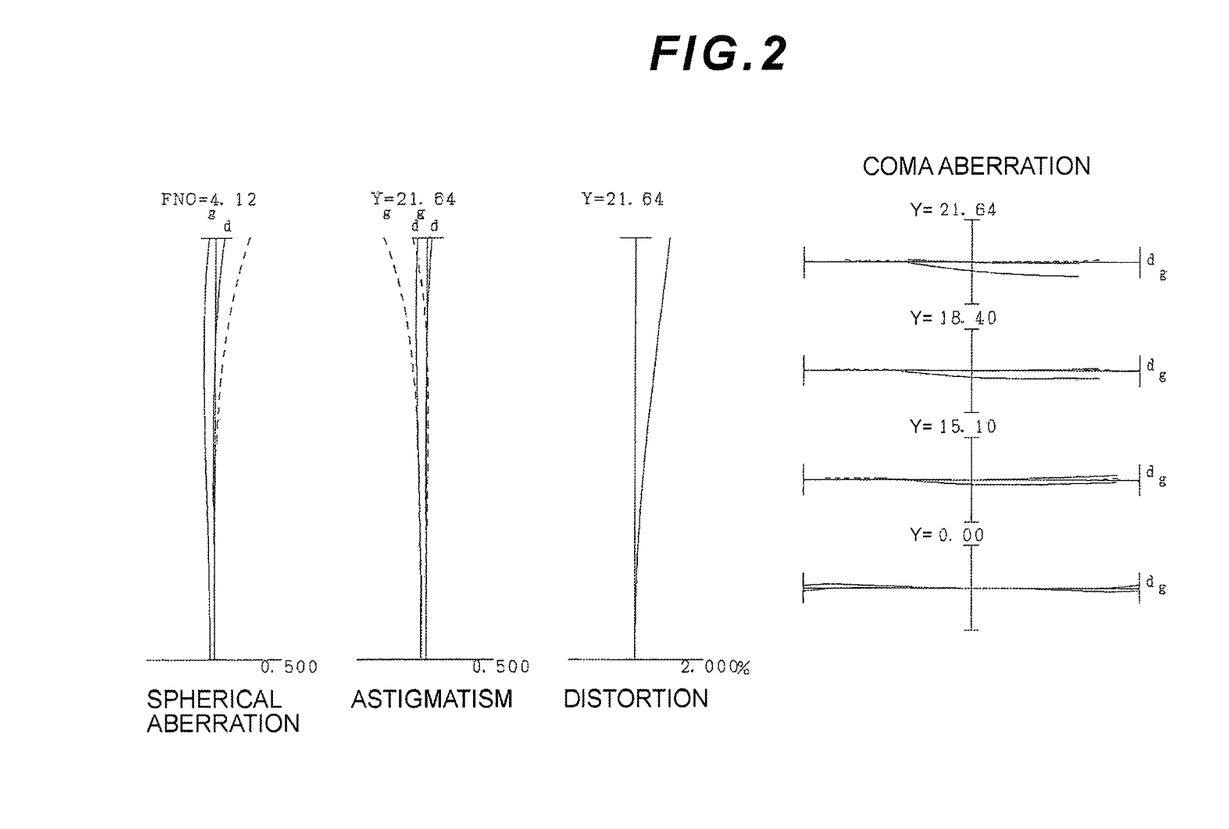
FIG. 2 are graphs showing various aberrations of the telephoto lens according to Example 1.

FIG. 2 are graphs showing various aberrations of the telephoto lens TL according to Example 1. In each of the graphs showing aberrations, FNO denotes an F number and Y denotes an image height. In each of the graphs showing aberrations, d denotes an aberrations at d-line (λ=587.6 nm), and g denotes an aberration at g-line (λ=435.8 nm) respectively. In each graph showing astigmatism, the solid line indicates the sagittal image surface, and the broken line indicates the meridional image surface. The description on the graphs showing aberrations is the same for the other examples.

As each of the graphs on aberrations show, various aberrations are corrected well, and excellent optical performance is exhibited in Example 1. As a result, excellent optical performance can be ensured for a digital single lens reflex camera CAM as well, by installing the telephoto lens TL of Example 1.

Example 2

Figure 5:
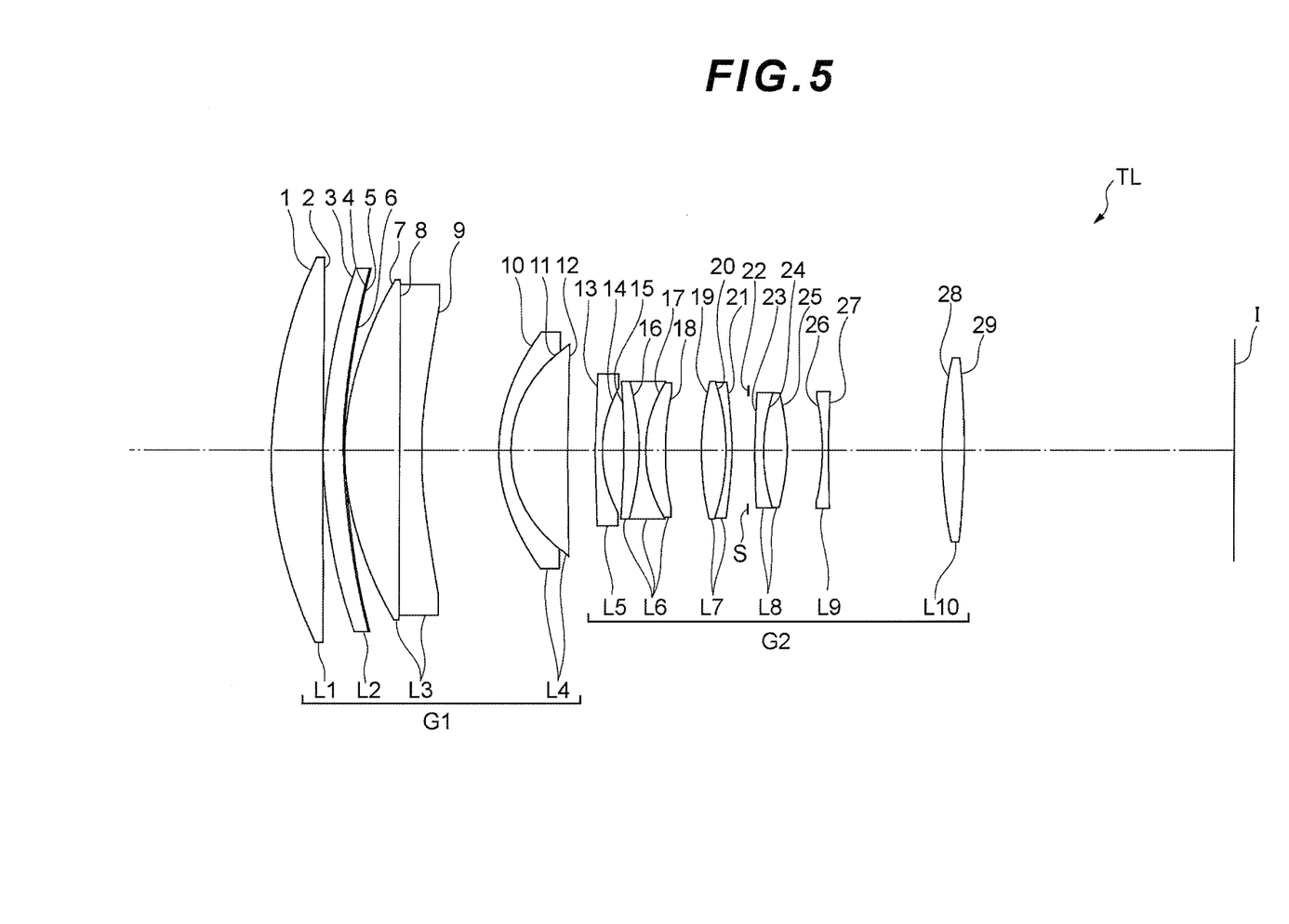
FIG. 5 is a cross-sectional view depicting a telephoto lens according to Example 2.

Example 2 will now be described with reference to FIG. 5, FIG. 6 and Table 2. FIG. 5 is a cross-sectional view of a telephoto lens TL according to Example 2. The telephoto lens TL according to Example 2 comprises, in order from an object: a first lens group G1 having positive refractive power; and a second lens group G2 having negative refractive power.

The first lens group G1 includes, in order from the object: a first lens L1 which is a positive meniscus lens having a convex surface facing the object; a second lens L2 having a positive meniscus lens having a convex surface facing the object; a third lens L3 which is a cemented lens; and a fourth lens L4 which is a cemented lens; and a diffractive optical element DOE is disposed on the lens surface facing the image plane I in the second lens L2. The diffractive optical element DOE is the same as the diffractive optical element of Example 1, therefore detailed description is omitted.

The second lens group G2 includes, in order from the object: a fifth lens L5 which is a single lens; a sixth lens L6 which is a cemented lens; a seventh lens L7 which is a cemented lens; an eighth lens L8 which is a cemented lens; a ninth lens L9 which is a single lens; and a tenth lens L10 which is a single lens. An aperture stop S is disposed between the seventh lens L7 and the eighth lens L8.

Table 2 shows each data value of Example 2. The surface numbers 1 to 29 in Table 2 corresponds to the surfaces 1 to 29 in FIG. 5. In Example 2, the fifth surface is the diffraction surface.

TABLE 2

[General Data]

f = 291.04
FNO = 4.1
2ω = 8.5
Y = 21.64
Bf = 53.00
L = 189.99

TABLE 2-continued

[Lens Data]

| Surface number | ri | di | nd | vd | |
|---|---|---|---|---|---|
| 1 | 89.990 | 10.13 | 1.7243 | 46.0 | |
| 2 | 14513.032 | 0.15 | | | |
| 3 | 113.223 | 4.09 | 1.5168 | 64.1 | |
| 4 | 133.781 | 0.10 | 1.5278 | 33.4 | |
| 5 | 133.781 | 0.10 | 1.5571 | 50.0 | (Diffraction surface) |
| 6 | 133.781 | 0.15 | | | |
| 7 | 65.200 | 12.00 | 1.4875 | 70.4 | |
| 8 | −343.150 | 3.00 | 1.8108 | 29.4 | |
| 9 | 130.199 | 15.25 | | | |
| 10 | 39.040 | 2.20 | 1.8671 | 36.8 | |
| 11 | 25.522 | 11.15 | 1.4875 | 70.4 | |
| 12 | 501.499 | 5.50 | | | |
| 13 | 296.544 | 1.50 | 1.8794 | 38.2 | |
| 14 | 28.025 | 4.10 | | | |
| 15 | −135.618 | 3.08 | 1.7664 | 25.8 | |
| 16 | −47.760 | 1.20 | 1.6635 | 49.2 | |
| 17 | 25.863 | 4.06 | 1.8467 | 23.8 | |
| 18 | 72.963 | 7.00 | | | |
| 19 | 60.989 | 5.12 | 1.4905 | 68.1 | |
| 20 | −42.595 | 1.20 | 1.8830 | 40.8 | |
| 21 | −78.784 | 3.00 | | | |
| 22 | ∞ | 1.60 | | | (Aperture stop) |
| 23 | 308.686 | 1.50 | 1.8763 | 36.1 | |
| 24 | 37.619 | 4.79 | 1.5590 | 41.0 | |
| 25 | −40.022 | 7.00 | | | |
| 26 | −45.886 | 1.17 | 1.8830 | 40.8 | |
| 27 | 182.232 | 22.57 | | | |
| 28 | 95.044 | 4.29 | 1.6421 | 31.4 | |
| 29 | −193.719 | 53.00 | | | |

[Diffraction Surface Data]

m = 1
C1 = −7.024E−05
C2 = 5.060E−09

Figure 6:
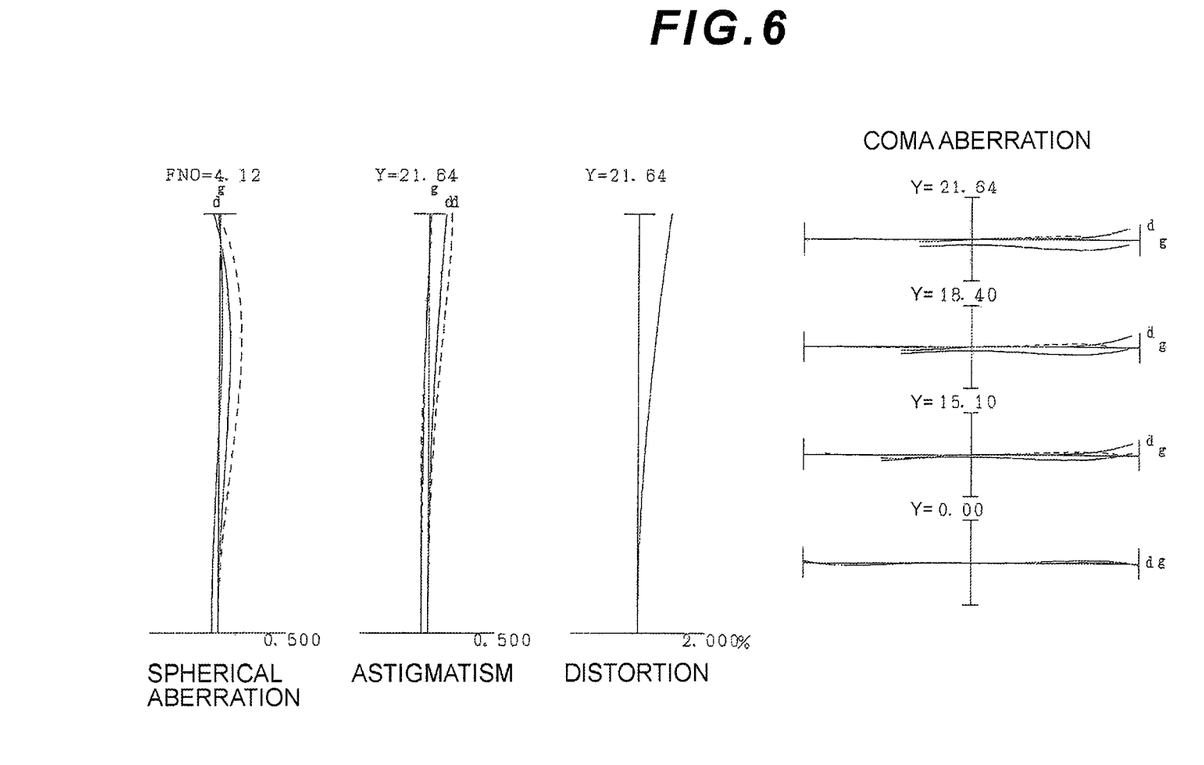
FIG. 6 are graphs showing various aberrations of the telephoto lens according to Example 2.

FIG. 6 are graphs showing various aberrations of the telephoto lens TL according to Example 2. As each of the graphs on Aberrations show, various aberrations are corrected well, and excellent optical performance is exhibited in Example 2. As a result, excellent optical performance can be ensured for a digital single lens reflex camera CAM as well, by installing the telephoto lens TL of Example 2.

Example 3

Figure 7:
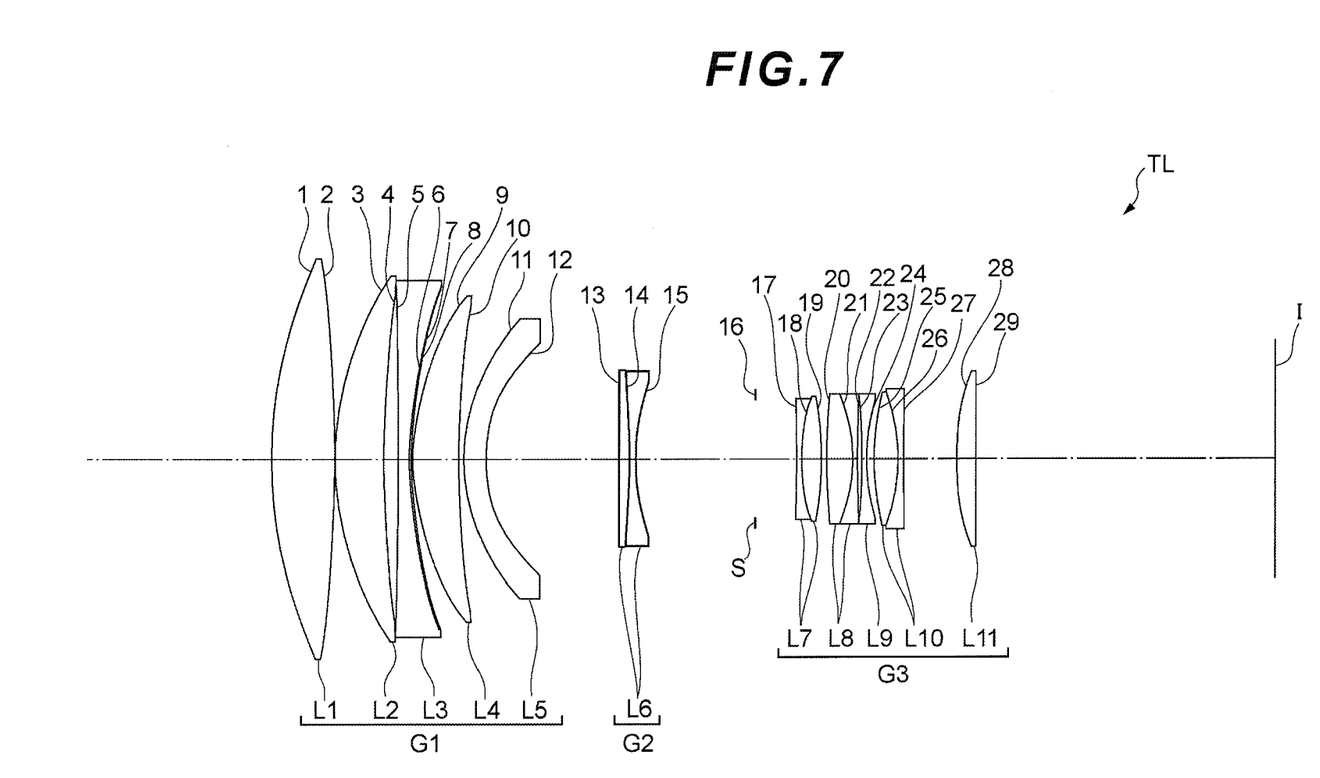
FIG. 7 is a cross-sectional view depicting a telephoto lens according to Example 3.

Example 3 will now be described with reference to FIG. 7, FIG. 8 and Table 3. FIG. 7 is a cross-sectional view of a telephoto lens TL according to Example 3. The telephoto lens TL according to Example 3 comprises, in order from an object: a first lens group G1 having positive refractive power; a second lens group G2 having negative refractive power; and a third lens group G3 having negative refractive power.

The first lens group G1 includes, in order from the object: a first lens L1 which is a biconvex positive lens having a convex surface facing the object; a second lens L2 having a positive meniscus lens having a convex surface facing the object; a third lens L3 which is a biconcave negative lens; and a fourth lens L4 which is a single lens; a fifth lens L5 which is a single lens; and a diffractive optical element DOE is disposed on the lens surface facing the image plane I in the third lens L3. The diffractive optical element DOE is the same as the diffractive optical element of Example 1, therefore detailed description is omitted.

The second lens group G2 is formed of a sixth lens group L6 which is a cemented lens. The third lens group G3 is formed of, from the object: a seventh lens L7 which is a cemented lens; an eighth lens L8 which is a cemented lens; a ninth lens L9 which is a single lens; a tenth lens L10 which is a cemented lens; and an eleventh lens L11 which is a single lens. An aperture stop S is disposed between the second lens G2 and the third lens G3.

Table 3 shows each data value of Example 3. The surface numbers 1 to 29 in Table 3 corresponds to the surfaces 1 to 29 in FIG. 7. In Example 3, the seventh surface is the diffraction surface.

TABLE 3

[General Data]

f = 291.65
FNO = 4.1
2ω = 8.5
Y = 21.64
Bf = 56.27
L = 190.44

[Lens Data]

| Surface number | ri | di | nd | vd | |
|---|---|---|---|---|---|
| 1 | 92.854 | 12.06 | 1.4875 | 70.4 | |
| 2 | −257.102 | 0.15 | | | |
| 3 | 63.888 | 9.22 | 1.4875 | 70.4 | |
| 4 | 252.914 | 2.77 | | | |
| 5 | −756.295 | 2.50 | 1.7015 | 41.2 | |
| 6 | 101.400 | 0.10 | 1.5278 | 33.4 | |
| 7 | 101.400 | 0.10 | 1.5571 | 50.0 | (Diffraction surface) |
| 8 | 101.400 | 0.15 | | | |
| 9 | 52.645 | 8.65 | 1.4875 | 70.4 | |
| 10 | 186.838 | 1.06 | | | |
| 11 | 39.633 | 4.21 | 1.6477 | 33.8 | |
| 12 | 29.099 | 24.87 | | | |
| 13 | −4126.337 | 2.05 | 1.8467 | 23.8 | |
| 14 | −198.225 | 1.36 | 1.5638 | 60.7 | |
| 15 | 45.285 | 22.66 | | | |
| 16 | ∞ | 7.96 | | | (Aperture stop) |
| 17 | −367.329 | 1.00 | 1.8467 | 23.8 | |
| 18 | 42.139 | 3.82 | 1.6200 | 36.3 | |
| 19 | −55.046 | 1.00 | | | |
| 20 | 128.741 | 4.96 | 1.7283 | 28.5 | |
| 21 | −29.702 | 1.00 | 1.6700 | 47.2 | |
| 22 | 557.255 | 0.68 | | | |
| 23 | −135.519 | 1.00 | 1.8830 | 40.8 | |
| 24 | 41.443 | 1.50 | | | |
| 25 | 55.304 | 4.45 | 1.6200 | 36.3 | |
| 26 | −36.951 | 1.06 | 1.8830 | 40.8 | |
| 27 | 832.057 | 10.23 | | | |
| 28 | 56.156 | 3.59 | 1.5407 | 47.2 | |
| 29 | 11740.530 | 56.27 | | | |

[Diffraction Surface Data]

m = 1
C1 = −8.605E−05
C2 = −1.979E−09

Figure 8:
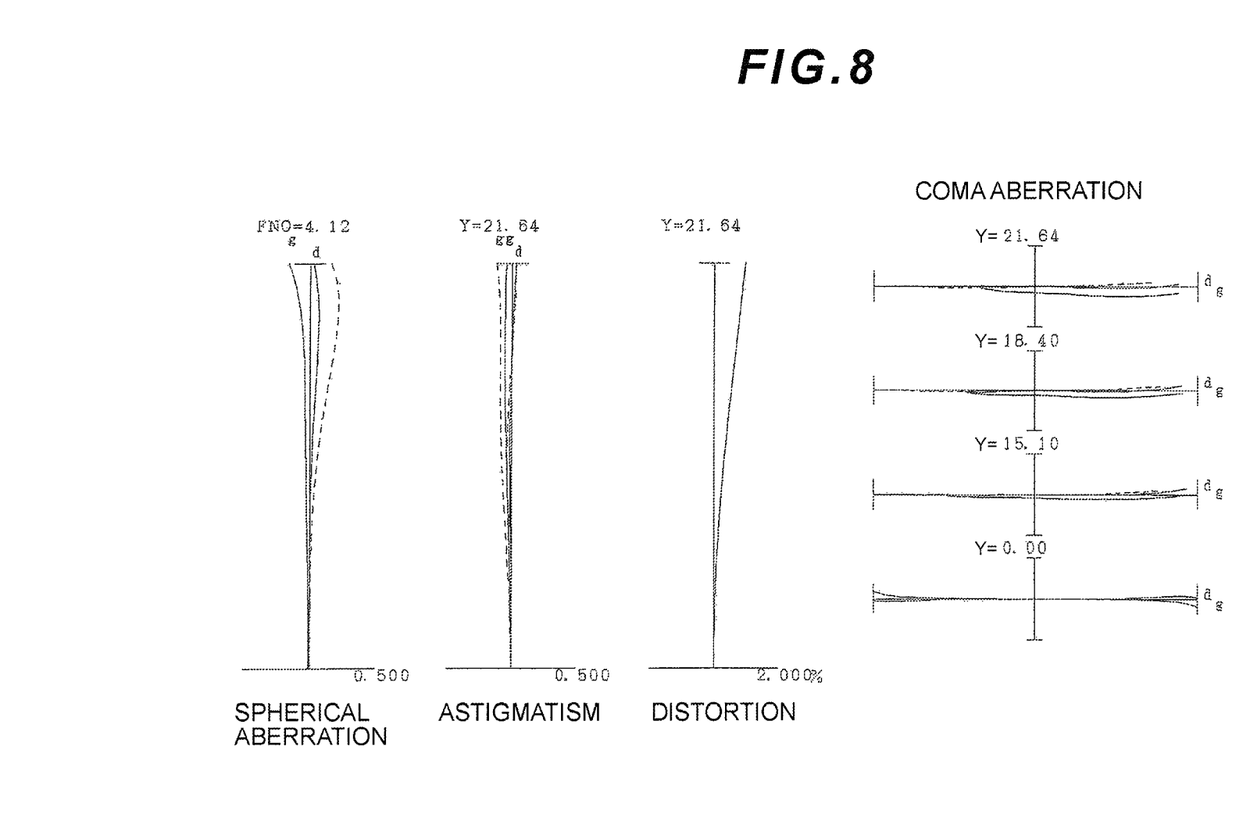
FIG. 8 are graphs showing various aberrations of the telephoto lens according to Example 3.

FIG. 8 are graphs showing various aberrations of the telephoto lens TL according to Example 3. As each of the graphs on aberrations show, various aberrations are corrected well, and excellent optical performance is exhibited in Example 3. As a result, excellent optical performance can be ensured for a digital single lens reflex camera CAM as well, by installing the telephoto lens TL of Example 3.

Table 4 shows conditional expression correspondence values in each example. In Table 4, f is a focal length of the telephoto lens TL, f1 is a focal length of the first lens group G1, f2 is a focal length of the second lens group G2, f3 is a focal length of the third lens group G3, fa is a combined focal length of each lens, from the lens closest to the object to the lens on which the diffractive optical element DOE is disposed, fd is a focal length of the diffractive optical element DOE, Rd is a radius of curvature of the lens surface on which the diffractive optical element DOE is disposed, and L is a total lens length (length converted into air).

TABLE 4

| | Example 1 | Example 2 | Example 3 |
|---|---|---|---|
| f | 291.00 | 291.04 | 291.65 |
| f1 | 87.50 | 68.05 | 109.32 |
| f2 | −74.12 | −48.27 | −89.14 |
| f3 | −247.07 | — | −364.79 |
| fa | 144.18 | 111.95 | 155.51 |
| fd | 8266.51 | 7118.76 | 5810.84 |
| Rd | 201.90 | 133.78 | 101.40 |
| L | 189.71 | 189.99 | 190.44 |
| fa/Rd | 0.71 | 0.84 | 1.53 |
| f1/fa | 0.61 | 0.61 | 0.70 |
| f/fd | 0.035 | 0.041 | 0.050 |
| L/f | 0.65 | 0.65 | 0.65 |

Thus in each example, each conditional expression mentioned above is satisfied respectively.

In each of the above embodiments, the following contents can be adopted within a range where the optical performance is not diminished.

In each of the examples, a three-lens group configuration was shown, but the present invention can also be applied to a configuration using a different number of lens groups, such as a four-lens group. In the configuration, a lens or a lens group may be added to the side closest to the object, or a lens or a lens group may be added to the side closest to the image. A "lens group" refers to a portion having at least one lens isolated by an air space which changes upon zooming.

A single or a plurality of lens group(s) or a partial lens group may be designed to be a focusing lens group which performs focusing from an object at infinity to an object at a short distance by moving in the optical axis direction. The focusing lens group can be applied to auto focus, and is also suitable for driving a motor for auto focusing (e.g. driving using an ultrasonic motor). It is particularly preferable that at least a part of the second lens group is designed to be the focusing lens group.

A lens group or a partial lens group may be designed to be a vibration-isolation lens group which corrects image blurs generated by hand motion by moving the lens group or the partial lens group in a direction perpendicular to the optical axis, or rotating (oscillating) a lens group or the partial lens group in an in-plane direction including the optical axis. It is particularly preferable that at least a part of the second lens group or the third lens group is designed to be the vibration-isolation lens group.

The lens surface may be formed to be a spherical surface or a plane, or an aspherical surface. In the case of a spherical surface or a plane, lens processing, assembly and adjustment are easy, and deterioration of optical performance due to an error in processing, assembly and adjustment can be prevented. Even if the image plane is shifted, the drawing performance is not affected very much, which is desirable. If the lens surface is aspherical, the aspherical surface can be any of: an aspherical surface generated by grinding; a glass molded aspherical surface generated by forming glass in an aspherical shape using a die; and a composite aspherical surface generated by forming resin on the surface of the glass into an aspherical shape. The lens surface may be a diffraction surface, and the lens may have a refractive index distributed lens (GRIN lens) or a plastic lens.

It is desirable that the aperture stop is disposed near the second lens group or the third lens group, but the role of the aperture stop may be substituted by the frame of the lens, without disposing a separate element as an aperture stop.

Each lens surface may be coated with an antireflection coating which has high transmittance in a wide wavelength region, in order to decrease flares and ghosts, and implement high optical performance with high contrast.

In the present embodiment, the telephoto lens was described as an example of an optical system, but the present invention is not limited to this, and may be such an optical system as a zoom lens, for example.

In the present embodiment, the telephoto lens (optical system) is used as the digital single lens reflex camera, but the present invention is not limited to this, and may be used for such an optical apparatus as a digital still camera and a digital video camera, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical system comprising:
   a plurality of lenses arranged in order from an object; and
   a diffractive optical element which has a diffraction grating,
   the diffractive optical element being disposed on one of lens surfaces of the plurality of lenses, and
   one of the following conditional expressions being satisfied:

$$0.50 < fa/Rd < 0.90$$

$$1.10 < fa/Rd < 2.00$$

where fa denotes a combined focal length of each lens from the lens, of the plurality of lenses which is closest to the object on which the diffractive optical element is disposed, and Rd denotes a radius of curvature of the lens surface on which the diffractive optical element is disposed.

2. The optical system according to claim 1, wherein the plurality of lenses of the optical system includes, in order from the object, a first lens group having positive refractive power, and a second lens group having negative refractive power.

3. The optical system according to claim 2, wherein the diffractive optical element is disposed on one of the lens surfaces of the first lens group.

4. The optical system according to claim 3, wherein the one of the lens surfaces of the first lens group is a lens surface on the image side.

5. The optical system according to claim 2, wherein the following conditional expression is satisfied:

$$0.50 < f1/fa < 0.80$$

where f1 denotes a focal length of the first lens group.

6. The optical system according to claim 2, wherein the diffractive optical element is disposed on one of the lens surfaces of the first lens group, and
   the following conditional expression is satisfied:

$$0.030 < f/fd < 0.060$$

where f denotes a focal length of the optical system, and fd denotes a focal length of the diffractive optical element.

7. The optical system according to claim 1, wherein the following conditional expression is satisfied:

$$0.50 < L/f < 0.75$$

where L denotes a total length of the optical system, and f denotes a focal length of the optical system.

8. The optical system according to claim 1, wherein the diffraction grating of the diffractive optical element has a rotationally symmetric shape.

9. An optical apparatus comprising an optical system for forming an image of an object on a predetermined surface,
   this optical system being the optical system according to claim 1.

10. A method for arranging a diffractive optical element in an optical system having a plurality of lenses arranged in order from an object and a diffractive optical element which has a diffraction grating,
    the method comprising:
    disposing the diffractive optical element on one of lens surfaces of the plurality of lenses,
    with one of the following conditional expressions being satisfied:

$$0.50 < fa/Rd < 0.90$$

$$1.10 < fa/Rd < 2.00$$

where fa denotes a combined focal length of each lens from the lens of the plurality of lenses which is closest to the object to the lens on which the diffractive optical element is disposed, and Rd denotes a radius of curvature of the lens surface on which the diffractive optical element is disposed.

11. The method for arranging a diffractive optical element according to claim 10, wherein the plurality of lenses of the optical system includes, in order from the object, a first lens group having positive refractive power, and a second lens group having negative refractive power.

12. The method for arranging a diffractive optical element according to claim 11, wherein the diffractive optical element is disposed on any of the lens surfaces of the first lens group.

13. The method for arranging a diffractive optical element according to claim 11, wherein the following conditional expression is satisfied:

$$0.50 < f1/fa < 0.80$$

where f1 denotes a focal length of the first lens group.

14. The method for arranging a diffractive optical element according to claim 11, wherein the diffractive optical element is disposed on one of the lens surfaces of the first lens group, and the following conditional expression is satisfied:

$$0.030 < f/fd < 0.060$$

where f denotes a focal length of the optical system, and fd denotes a focal length of the diffractive optical element.

15. The method for arranging a diffractive optical element according to claim 10, wherein the following conditional expression is satisfied:

$$0.50 < L/f < 0.75$$

where L denotes a total length of the optical system, and f denotes a focal length of the optical system.

16. The optical system according to claim 1, further comprising an aperture stop, and wherein the diffractive optical element is disposed to the object side of the aperture stop.

* * * * *